(12) United States Patent
Schumann

(10) Patent No.: US 7,742,544 B2
(45) Date of Patent: Jun. 22, 2010

(54) SYSTEM AND METHOD FOR EFFICIENT CABAC CLOCK

(75) Inventor: Reinhard Schumann, Exeter, NH (US)

(73) Assignee: Broadcom Corporation, Irvine, CA (US)

( * ) Notice: Subject to any disclaimer, the term of this patent is extended or adjusted under 35 U.S.C. 154(b) by 882 days.

(21) Appl. No.: 10/981,218

(22) Filed: Nov. 4, 2004

(65) Prior Publication Data

US 2005/0262375 A1 Nov. 24, 2005

Related U.S. Application Data

(60) Provisional application No. 60/573,314, filed on May 21, 2004.

(51) Int. Cl.
*H03K 9/00* (2006.01)
*H04L 27/00* (2006.01)
*G06F 1/00* (2006.01)

(52) U.S. Cl. .................................. 375/316; 713/500

(58) Field of Classification Search .............. 375/316; 713/500; 382/247
See application file for complete search history.

(56) References Cited

U.S. PATENT DOCUMENTS

| | | | | |
|---|---|---|---|---|
| 7,030,647 | B1 * | 4/2006 | White et al. | ............ 326/38 |
| 2002/0078276 | A1 * | 6/2002 | Hung | ............ 710/74 |
| 2003/0215018 | A1 | 11/2003 | MacInnis | |
| 2004/0240559 | A1 | 12/2004 | Prakasam | |
| 2004/0255188 | A1 * | 12/2004 | Lo | ............ 714/12 |
| 2004/0260739 | A1 | 12/2004 | Schumann | |
| 2005/0232505 | A1 * | 10/2005 | Pearson et al. | ............ 382/247 |
| 2005/0259747 | A1 | 11/2005 | Schumann | |

* cited by examiner

*Primary Examiner*—David C Payne
*Assistant Examiner*—Brian J Stevens
(74) *Attorney, Agent, or Firm*—McAndrews, Held & Malloy, Ltd.

(57) ABSTRACT

A system and method that process data in a circuitry utilizing two clocks. The two clocks may be an offset version of one another. Utilizing two clocks to processes the data may consume fewer clock cycles than using only one clock. The circuitry may comprise registers and a memory, wherein one register may receive a location of information in the memory, which may then be read from the received location. The one register may utilize a first of the two clocks, and the reading from the memory may utilize the second of the two clocks. The circuitry may comprise a portion of a CABAC decoder.

22 Claims, 5 Drawing Sheets

SYSTEM AND METHOD FOR EFFICIENT CABAC CLOCK

RELATED APPLICATIONS

This patent application makes reference to, claims priority to and claims benefit from U.S. Provisional Patent Application Ser. No. 60/573,314, entitled "System and Method for Efficient CABAC Clock," filed on May 21, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A typical Context Adaptive binary arithmetic coding (CABAC) decoder reads and updates state information for each decoded bit. The state information is often stored in a memory unit. In a data sequence, for each decoded bit, state information is read from the memory, an arithmetic operation is performed, and updated state information is written back to the memory. In a synchronous system, these operations are typically allocated to multiple clock cycles, forming a pipeline, if the entire sequence cannot be completed in one clock cycle.

Each of the needed operations takes a different amount of time to complete. Therefore, the clock rate is limited by the slowest stage of the pipeline. In other stages there will typically be slack time to the extent that the full cycle time is not needed to complete the operation(s) in that stage. As a result, the total time to decode one bit, which is determined by the number of pipeline stages times the clock cycles time, may be significantly longer than the sum of the times needed to complete each individual operation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that processes data in a circuitry utilizing two clocks. The method may comprise utilizing a first clock to run a first portion of processes associated with the circuitry and utilizing a second clock to run a second portion of the processes associated with the circuitry. Running the first and second portions of the processes utilizing the first clock and the second clock may consume fewer clock cycles than running the first and second portions of the processes using only one clock. In an embodiment of the present invention, the second clock may be an offset version of the first clock.

In an embodiment of the present invention, the data may comprise CABAC encoded data and the circuitry may comprise at least a portion of a CABAC decoder.

In an embodiment of the present invention, the first portion of the processes may comprise receiving a location of information to be read from a memory associated with the circuitry. The second portion of the processes may comprise reading the information from the received location in the memory.

The system may comprise at least one processor capable of performing the method that processes data in a circuitry utilizing two clocks. In an embodiment of the present invention, the at least one processor may comprise hardware module, software modules, or a combination thereof. In another embodiment of the present invention, the at least one processor may comprise a microprocessor.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention generally relate to a method and system for implementing an efficient clock. More specifically, the present invention relates to a system in which a clock is used to read data from and write data to memory in an efficient manner. Although the following discussion relates to CABAC decoding, it should be understood that the present invention may be used in other systems that utilize clocks in reading and writing data from and to memory.

Figure 1A:
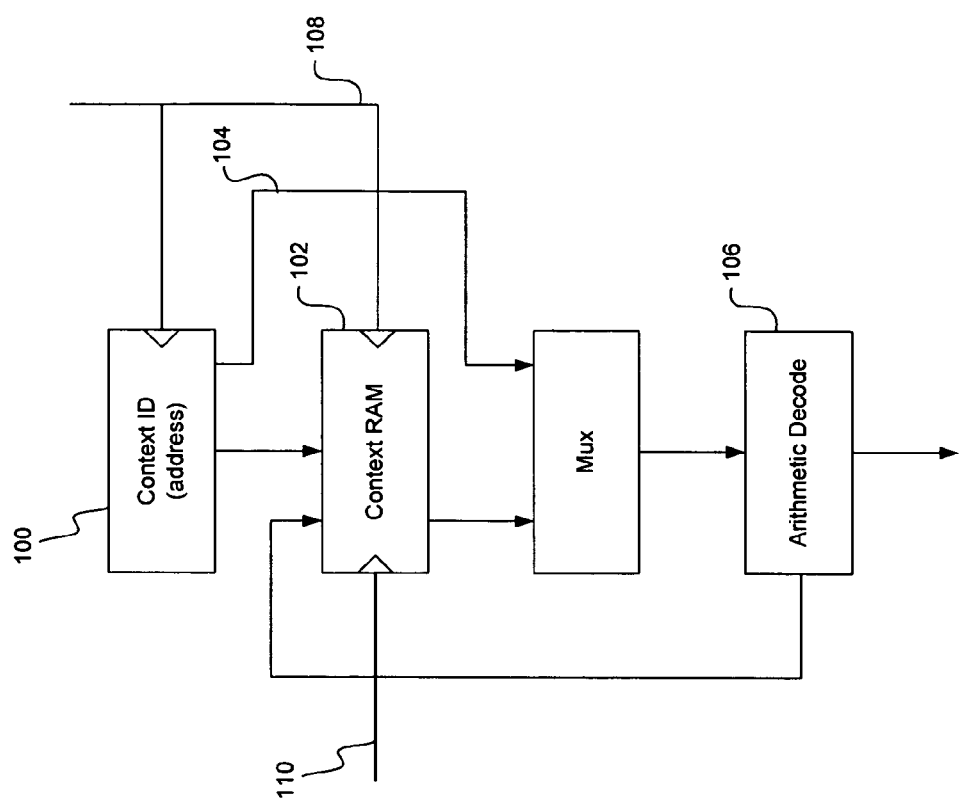
FIG. 1A illustrates a block diagram of an exemplary high level CABAC pipeline circuit, in accordance with an embodiment of the present invention.

FIG. 1A illustrates a block diagram of an exemplary high level CABAC pipeline circuit, in accordance with an embodiment of the present invention. The CABAC context identifier register 100 may receive an address indicating where a requested context may be located. The received context address may then be used to retrieve the corresponding context from the context RAM 102. The retrieved context may then be used in the arithmetic decoder 106. If the received context address is the same as the previous one, the context may not need to be retrieved from the RAM 102, since it may be still in the arithmetic decoder 106. In such a case, the RAM 102 may be bypassed via a path 104. The decoded arithmetic context may then be written back to the RAM 102.

One clock 108 may be utilized with a portion of the circuit such as, for example, the context identifier register 100 in receiving the context address, and some functions associated with the RAM 102. For example, writing of the decoded context may utilize the clock 108. Another clock 110 may be utilized in another portion of the circuit such as, for example, other functions associated with the RAM 102 such as, retrieving of a context based on the received context address. The clock 110 may be an offset version of the clock 108. The offset between the two clocks may be an amount of time enough to ensure that a whole clock cycle is not needed between receiving a context address and reading the address from the RAM 102.

Figure 1B:
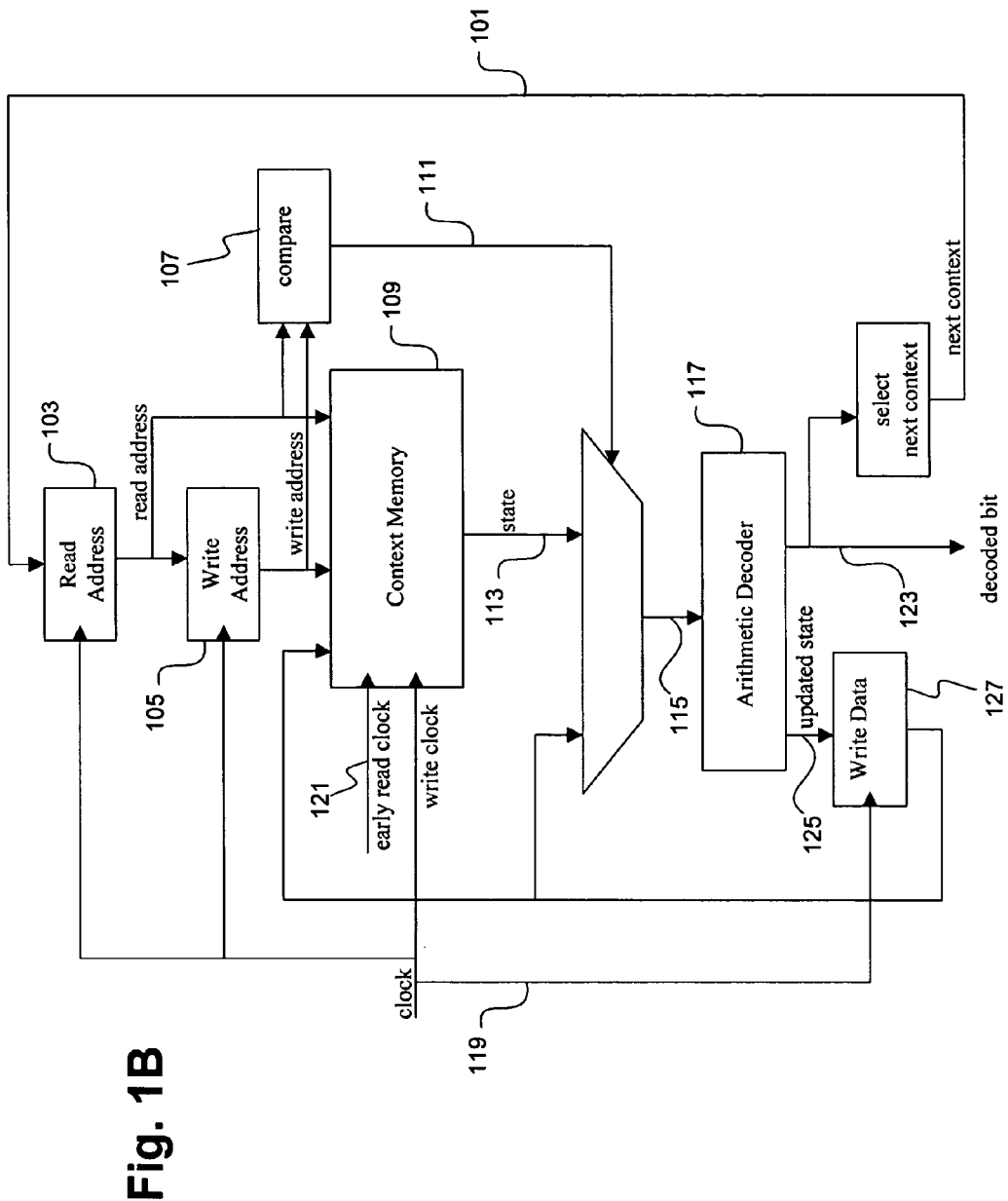
FIG. 1B illustrates a block diagram of an exemplary CABAC pipeline circuit, in accordance with an embodiment of the present invention.

FIG. 1B illustrates a block diagram of an exemplary CABAC pipeline circuit, in accordance with an embodiment of the present invention. The state update section of a CABAC decoder may receive a context identifier 101 associated with a decoded bit, the context identifier 101 may be an address indicating where a requested context may be located. The address may be stored in a read address register 103. The received context address may then be used to retrieve the corresponding context from the context RAM 109. The write address register 105 may contain the address of the context written in the previous cycle. A comparator 107 may compare the contents of the read address register 103 and the write address register 105. When the read address 103 and the write address 105 are the same, the bypass 111 may be used instead of the output 113 of the RAM 109, since the context to be read is the same one as was written in the previous cycle. The retrieved context 115 may then be used in the arithmetic decoder 117.

In an embodiment of the present invention, the read address register 103, the write address register 105, and the write clock terminal of the context RAM 109 may run on a first clock 119. The read clock terminal of the context RAM 109 may be connected to a second clock 121. The second clock 121 may be an offset version of the first clock 119. The read address register 103 may use a first clock cycle of the first clock 119 to receive the address 101 of the context. Then during the second clock cycle, the context RAM 109 may be accessed to retrieve the context state 113. Also during the second cycle, the arithmetic decoder 117 may compute a decoded bit 123 and updated state 125. During a third clock cycle the updated state 125 may be written back to the context RAM 109 via a write data register 127.

Figure 2:
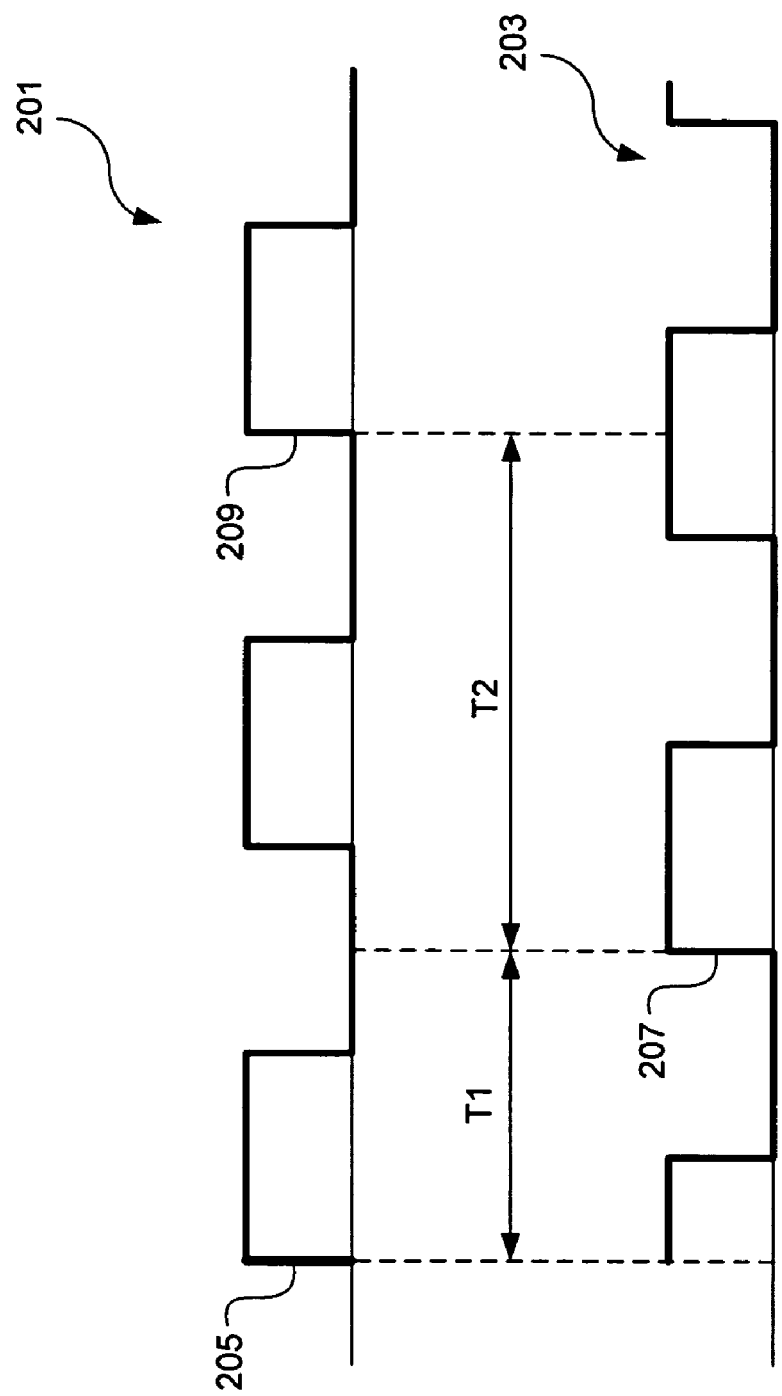
FIG. 2 illustrates a timing diagram of exemplary first and second clocks, in accordance with an embodiment of the present invention.

FIG. 2 illustrates a timing diagram of exemplary first and second clocks, in accordance with an embodiment of the present invention. The timing diagram 201 may correspond to a first clock such as, for example, the first clock 119 of FIG. 1B, and the timing diagram 203 may correspond to a second clock such as, for example, the second clock 121.

In an embodiment of the present invention, the time difference between the rising edge 205 of the first clock cycle and the next rising edge 207 of the second clock cycle may be an amount of time $T_1$. During the amount of time $T_1$ the read address may be transferred from the read address register 103 to the read address input of the context RAM 109. The amount of time $T_2$ from the rising edge 207 of the second clock to the next rising edge 209 of the first clock may be an amount of time longer than one clock cycle, and may be long enough for the context to be retrieved from the context RAM 109 and for the arithmetic decoder 117 to complete its operation during the same clock cycle.

Figure 3:
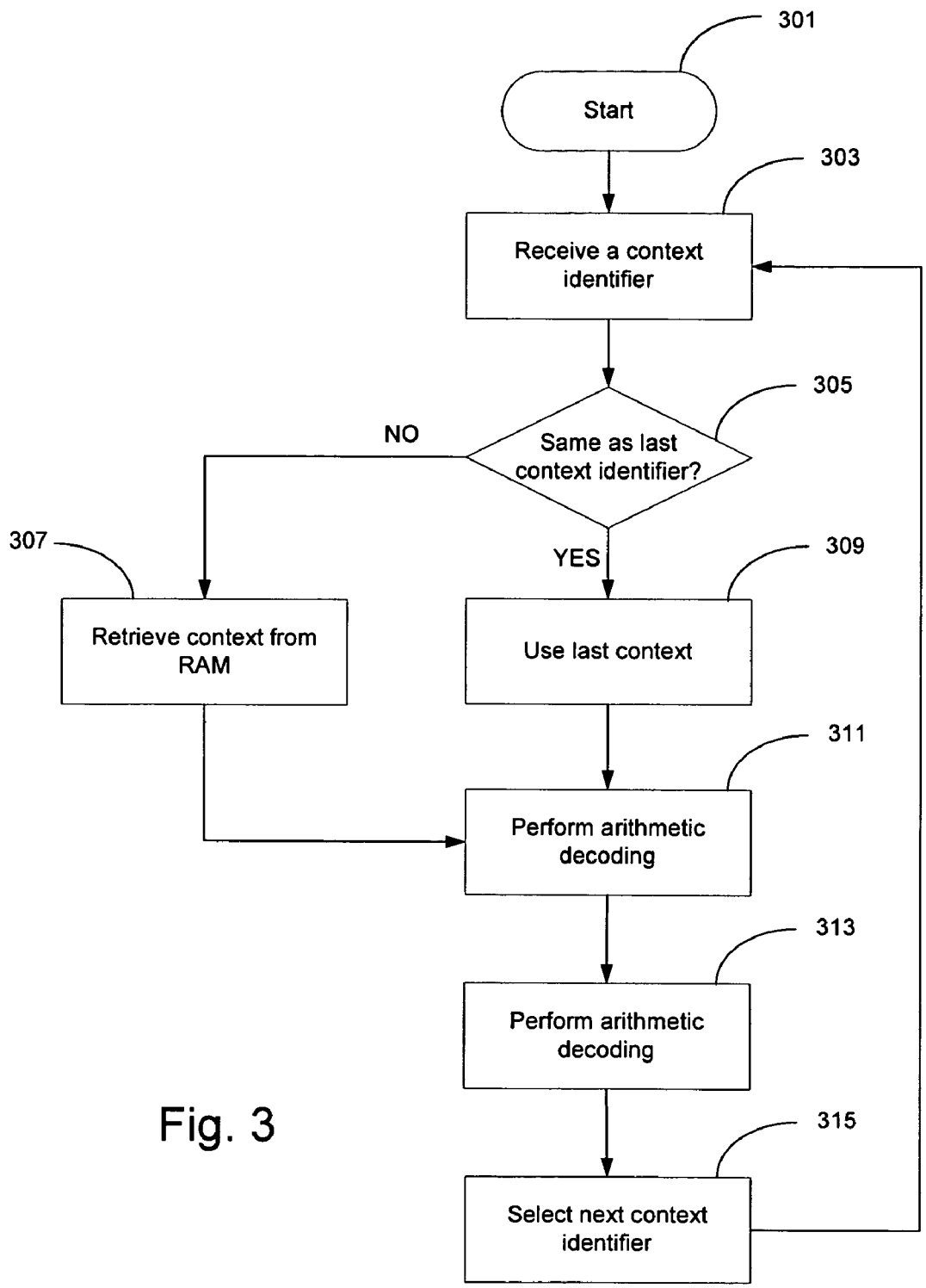
FIG. 3 illustrates a flow diagram of an exemplary method utilizing two clocks in a CABAC pipeline circuit, in accordance with an embodiment of the present invention.

FIG. 3 illustrates a flow diagram of an exemplary method utilizing two clocks in a CABAC pipeline circuit, in accordance with an embodiment of the present invention. The method may start at a starting block 301, and at a next block 303 a context identifier may be received from a data stream. The received identifier may then be compared to the last received identifier at a next block 305. If the received identifier is the same as the previous one, the previous context may be retrieved at a block 309 and used to arithmetically decode the context at a block 311. The decoded data may then be written to a RAM at a next block 313. Then at a next block 315 the next context identifier for decoding may be selected from the data stream and the process begins again at a block 303.

If the received identifier is not the same as the previous one, the received identifier may be used to retrieve the associated context from the RAM at a block 307. The context may then be used to arithmetically decode the context at a block 311. The decoded data may then be written to a RAM at a next block 313. Then at a next block 315 the next context for decoding may be selected from the data stream and the process begins again at a block 303.

In an embodiment of the present invention, the method of the flow diagram of FIG. 3 may be performed utilizing a circuit such as, for example, the CABAC pipeline circuit of FIG. 1B. The pipeline circuit may be a portion of a system such as, for example, a video decoder where the incoming encoded video stream may be video data encoded utilizing coding schemes such as, for example, CABAC.

Figure 4A:
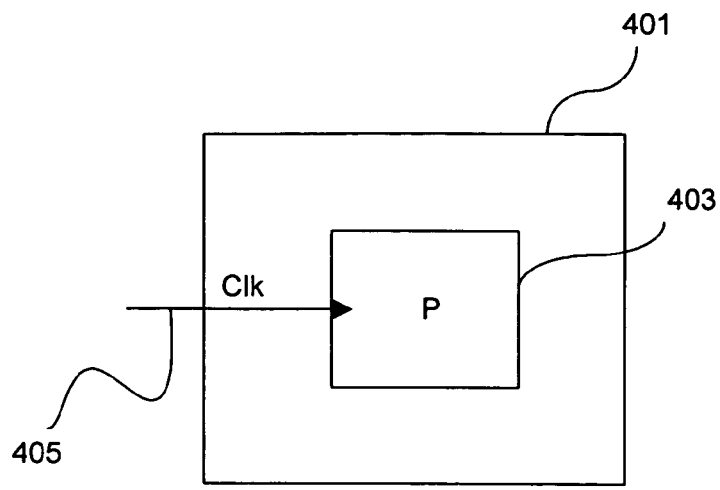
FIG. 4A illustrates an exemplary block diagram of a CABAC decoder, in accordance with an embodiment of the present invention.

FIG. 4A illustrates an exemplary block diagram of a CABAC decoder, in accordance with an embodiment of the present invention. The CABAC decoder 401 may comprise a processor 403. The processor 403 may comprise hardware modules, software modules, or a combination thereof. In an embodiment of the present invention, the processor 403 may comprise a microprocessor. The processor 403 may utilize a clock 405, wherein different modules in the processor 403 may utilize the clock 405 and offset versions of the clock 405.

Figure 4B:
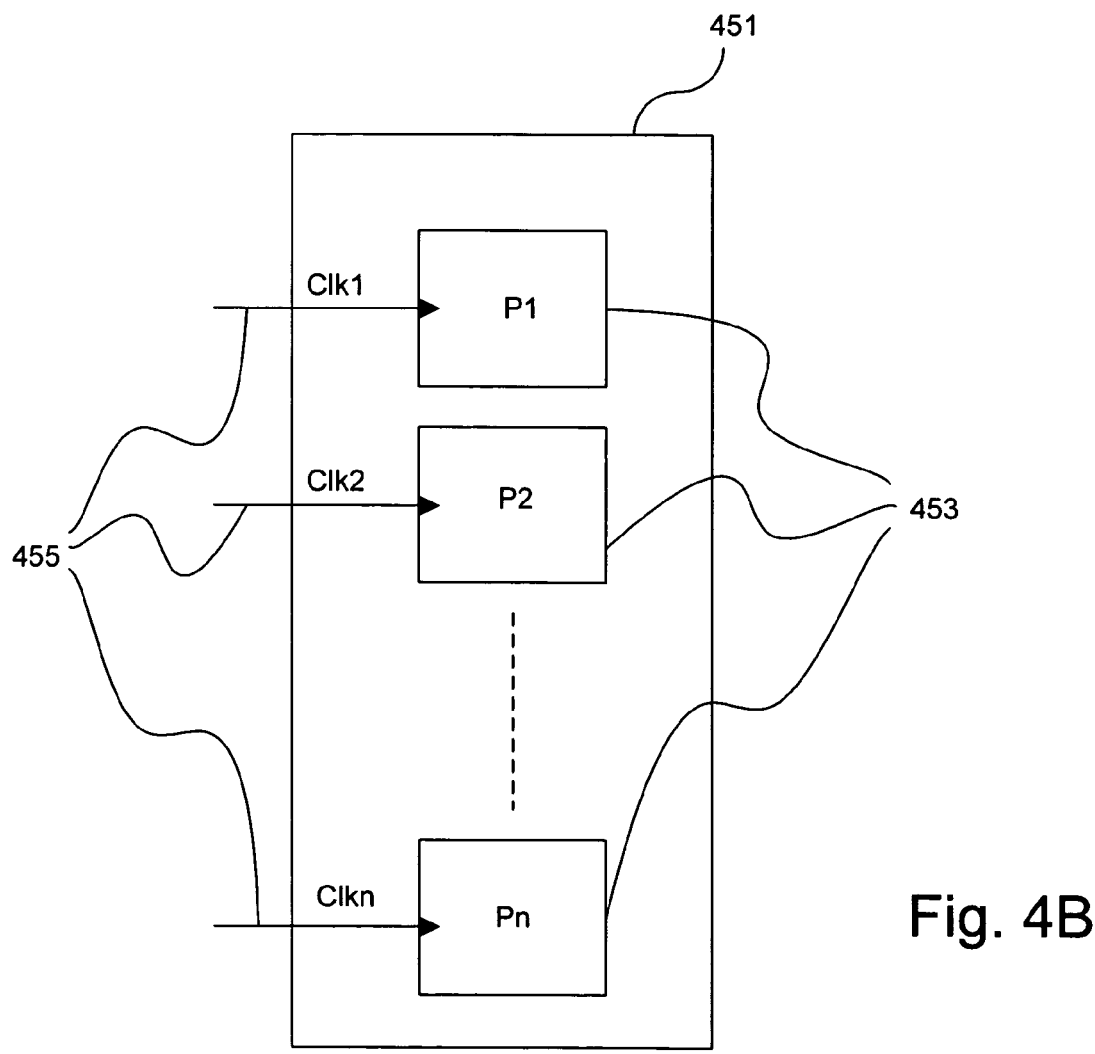
FIG. 4B illustrates another exemplary block diagram of a CABAC decoder, in accordance with an embodiment of the present invention.

FIG. 4B illustrates another exemplary block diagram of a CABAC decoder, in accordance with an embodiment of the present invention. The CABAC decoder 451 may comprise two or more processors 453. Each of the processors 453 may comprise hardware modules, software modules, or a combination thereof. In an embodiment of the present invention, each processor 453 may comprise a microprocessor. Each of the processors 453 may utilize one of n clocks 455 with the different modules in the processors 453. The clock 455 may be the same clock or offset versions of one clock.

The modules associated with FIG. 4A and FIG. 4B may comprise modules generally capable of being configured to carry out the processes and activities of a CABAC pipeline circuit as described hereinabove in FIG. 1A and FIG. 1B, and the method described by FIG. 3.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that processes data in a circuitry, the method comprising:
   receiving an indicator indicating a CABAC context for a particular CABAC symbol utilizing a first clock;
   retrieving the CABAC context, indicated by the indicator for the particular CABAC symbol, utilizing a second clock;
   wherein running the first and second portions of the processes utilizing the first clock and the second clock consumes fewer clock cycles of each clock individually than receiving the indicator and retrieving the CABAC context using only one clock.

2. The method according to claim 1 wherein the second clock is an offset version of the first clock, and wherein receiving the indicator of the CABAC context occurs at a rising edge of the first clock, wherein retrieving the CABAC context indicated by the indicator occurs at the next rising edge of the second clock that follows the rising edge of the first clock.

3. The method according to claim 1 wherein the first portion of the processes comprises receiving a location of information to be read from a memory associated with the circuitry.

4. The method according to claim 3 wherein the second portion of the processes comprises reading the information from the received location in the memory.

5. The method of claim 1, wherein the symbol is decoded using the CABAC context indicated by the indicator using the first clock.

6. The method according to claim 5 wherein the second clock is an offset version of the first clock, and wherein receiving the indicator of the CABAC context occurs at a rising edge of the first clock, wherein retrieving the CABAC context indicated by the indicator occurs at the next rising edge of the second clock that follows the rising edge of the first clock, and wherein the symbol is decoded at the next rising edge of the first clock following said rising edge of the second clock.

7. The method of claim 1, wherein the receiving the indicator and retrieving the CABAC context indicated by the indicator are preformed serially.

8. A system that processes data in a circuitry, the system comprising:
   at least one processor capable of receiving an indicator indicating a CABAC context for a particular CABAC symbol utilizing a first clock;
   the at least one processor capable of retrieving the CABAC context, indicated by the indicator for the particular CABAC symbol, utilizing a second clock;
   wherein running the first and second portions of the processes utilizing the first clock and the second clock consumes fewer clock cycles of each clock individually than receiving the indicator and retrieving the CABAC context using only one clock.

9. The system according to claim 8 wherein the second clock is an offset version of the first clock, and wherein receiving the indicator of the CABAC context occurs at a rising edge of the first clock, wherein retrieving the CABAC context indicated by the indicator occurs at the next rising edge of the second clock that follows the rising edge of the first clock.

10. The system according to claim 8 wherein the first portion of the processes comprises receiving a location of information to be read from a memory associated with the circuitry.

11. The system according to claim 10 wherein the second portion of the processes comprises reading the information from the received location in the memory.

12. The system of claim 8, wherein the symbol is decoded using the CABAC context indicated by the indicator using the first clock.

13. The system of claim 12, wherein the second clock is an offset version of the first clock, and wherein receiving the indicator of the CABAC context occurs at a rising edge of the first clock, wherein retrieving the CABAC context indicated by the indicator occurs at the next rising edge of the second clock that follows the rising edge of the first clock, and wherein the symbol is decoded at the next rising edge of the first clock following said rising edge of the second clock.

14. The system of claim 8, wherein the receiving the indicator and retrieving the CABAC context indicated by the indicator are preformed serially.

15. A circuitry that processes data, the circuitry comprising:
   a first set of components that receive an indicator indicating a CABAC context for a particular CABAC symbol utilizing a first clock to run a first portion of processes;
   a second set of components that retrieve the CABAC context, indicated by the indicator for the particular CABAC symbol, utilizing a second clock to run a second portion of the processes; and
   wherein running the first and second portions of the processes utilizing the first clock and the second clock consumes fewer clock cycles of each clock individually than receiving the indicator and retrieving the CABAC context using only one clock.

16. The circuitry according to claim 15 wherein the second clock is an offset version of the first clock, and wherein receiving the indicator of the CABAC context occurs at a rising edge of the first clock, wherein retrieving the CABAC context indicated by the indicator occurs at the next rising edge of the second clock that follows the rising edge of the first clock.

17. The circuitry according to claim 15 further comprising a memory.

18. The circuitry according to claim 17 wherein the first set of components comprises a register that receives and stores information to be read from the memory.

19. The circuitry according to claim 18 wherein the second set of components comprises the memory.

20. The circuitry of claim 15, wherein the symbol is decoded using the CABAC context indicated by the indicator using the first clock.

21. The circuitry of claim 20, wherein the second clock is an offset version of the first clock, and wherein receiving the indicator of the CABAC context occurs at a rising edge of the first clock, wherein retrieving the CABAC context indicated by the indicator occurs at the next rising edge of the second clock that follows the rising edge of the first clock, and wherein the symbol is decoded at the next rising edge of the first clock following said rising edge of the second clock.

22. The circuitry of claim 15, wherein the receiving the indicator and retrieving the CABAC context indicated by the indicator are preformed serially.

* * * * *